United States Patent [19]

Jörgens et al.

[11] Patent Number: 4,695,137
[45] Date of Patent: Sep. 22, 1987

[54] MOTORIZED FOCUS DRIVE FOR A MICROSCOPE

[75] Inventors: Reinhard Jörgens, Oberkochen; Bernd Faltermeier; Franz Trautwein, both of Aalen, all of Fed. Rep. of Germany

[73] Assignee: Carl-Zeiss-Stiftung, Heidenheim/Brenz, Oberkochen, Fed. Rep. of Germany

[21] Appl. No.: 833,137

[22] Filed: Feb. 26, 1986

[51] Int. Cl.⁴ .......................... G02B 21/24; G05B 1/06
[52] U.S. Cl. ..................................... 350/521; 318/640
[58] Field of Search ........................ 350/507, 521, 530; 318/602, 640; 250/201 AF, 201 PF, 204; 355/56; 354/195.1, 195.12, 400

[56] References Cited

U.S. PATENT DOCUMENTS 3,721,759  3/1973  Lang ................................ 350/530
3,798,449  3/1974  Reinheimer et al. .............. 350/530

FOREIGN PATENT DOCUMENTS 3318959  12/1983  Fed. Rep. of Germany ...... 350/507

*Primary Examiner*—John K. Corbin
*Assistant Examiner*—Vincent J. Lemmo
*Attorney, Agent, or Firm*—Hopgood, Calimafde, Kalil, Blaustein & Judlowe

[57] ABSTRACT

The operating means for manual focusing of a microscope having a motorized-focus drive is embodied in a separate control console that is flexibly connected to and positionable alongside the microscope; the operating means includes a finger wheel or knob which is coupled with an electrical bit-signal generator (encoder). Digital output signals of the encoder are fed to control electronics for the focus-drive motor, and the electronic control system may either be contained within the control console, or it may be packaged, along with further electronic control means for additional functions, in a separate housing provided for the purpose. The indicated arrangement makes possible manually operated focus adjustment which, although admittedly indirect in its action via the motor of the focus drive, is nevertheless very sensitive; in addition, the availability of digital output signals from the encoder enables further simplification in the operation of the microscope, particularly when specimens are successively transferred and from the microscope stage, and when a multiple-lens turret of the microscope is controlled from the console, with electronic coordination of focus, turret-indexing and specimen-transfer automation.

11 Claims, 3 Drawing Figures

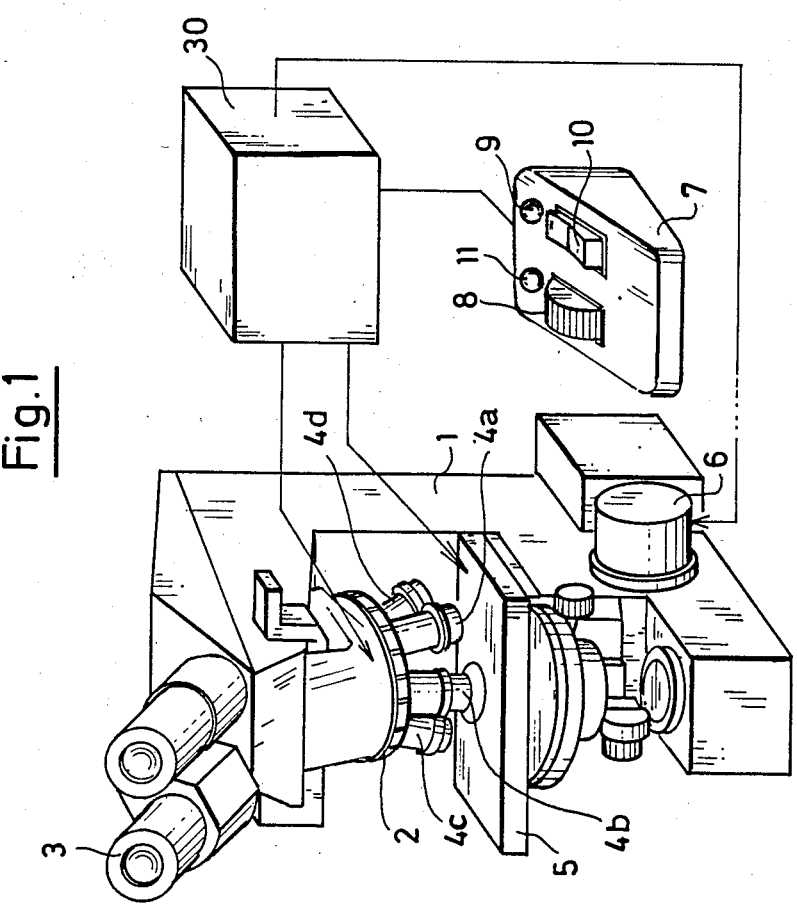

MOTORIZED FOCUS DRIVE FOR A MICROSCOPE

BACKGROUND OF THE INVENTION

Microscopes, as a rule, have a focus drive which is manually operated by means of two coaxially arranged knobs, for vertical displacement of either the microscope stage or the lens-mounting turret. One of these actuating knobs serves for rough adjustment; and the other, via gearing of strong step-down ratio, serves for fine adjustment. These knobs are frequently arranged laterally on both the left-hand side and the right-hand side of the microscope stand.

Microscopes are also known to have a focus drive which can be motor-driven. In the case of microscopes for routine examinations, as for example, examination of products of the semiconductor industry, a so-called "autofocus" is frequently provided with a motor drive which automatically brings the focal plane of the microscope optical system onto the surface of the object to be examined. It is customary to connect the motor on the shaft of the focus drive, in place of the actuating knobs on one side of the microscope; in such case, the remaining actuating knobs on the other side of the microscope serve for manual focusing.

This "autofocus" arrangement is, however, frequently unfavorable. Thus, for example in the semiconductor industry, when inspecting wafers or masks, it is important that the operator shall not come too close to the specimen objects on the microscope stage, in order to reduce as much as possible the danger of dust-particle contamination of the specimen. Furthermore, at inspection work stations, the microscope is generally incorporated in a handling system for the automatic feeding, loading and transfer of specimens in and out of the microscope-viewing region, so that operating means on the microscope stand are accessible only with difficulty, if at all.

Federal Republic of Germany OS No. 3,410,201 discloses a microscope with a motor-driven focus drive in which the motor is coupled, via a magnetically shiftable clutch and spur gearing, to the shaft which interconnects the fine-adjustment operating knobs on the respective lateral sides of the microscope. The base of the microscope is provided with additional operating means in the form of a switch by which the drive motor for the focus drive can be operated for a rapid (rough) focusing adjustment. The speed of focus adjustment in this case depends on the power of the lens currently in operative position. This known microscope also has the disadvantages mentioned above since all operating means, namely, the adjustment knobs and the switch, are arranged on the microscope stand itself.

BRIEF STATEMENT OF THE INVENTION

The object of the present invention is so to develop the operating means for motorized-focus drive in a microscope that the operating means are easily accessible and are as far as possible from the microscope stand. Another object is to achieve the foregoing object while preserving the customary fine sensitivity of manual focusing.

To achieve this purpose, the operating means for manual focusing is embodied in a separate control console that is flexibly connected to and positionable alongside the microscope; the operating means includes a finger wheel or knob which is coupled with an electrical bit-signal generator (encoder). Digital output signals of the encoder are fed to control electronics for the focus-drive motor, and the electronic control system may either be contained within the control console, or it may be packaged, along with further electronic control means for additional functions, in a separate housing provided for the purpose.

The indicated arrangement makes possible manually operated focus adjustment which, although admittedly indirect in its action via the motor of the focus drive, is nevertheless very sensitive; in addition, the availability of digital output signals from the encoder enables further simplification in the operation of the microscope. Thus, and preferably, finger-wheel actuation can also serve to disconnect the "autofocus" device of the microscope without requiring that an "off" button shall first have been actuated. The separate console may also contain remote-control means for indexing a motor-driven lens turret, in which case an electronic step-down system between the encoder and the focus-drive motor can control the speed of focusing displacement as an inverse function of the power of the lens which is currently indexed into operating position.

The control console may also contain other operating elements necessary for controlling functions of the microscope; these other elements may illustratively include an on/off switch for the autofocus device of the microscope, and a switch for changing the microscope between bright-field and dark-field illumination.

Since the control console can be flexibly positioned away from the microscope itself, and since many of the requisite operating parts need no longer be on the microscope, any danger that the observer might contaminate a specimen is considerably reduced.

DETAILED DESCRIPTION

The invention will be illustratively described in conjunction with the accompanying drawings, in which:

FIG. 1 is a perspective view of a microscope with a separate control console for the control of various functions;

FIG. 2 is a plan view of the control console of FIG. 1; and

Figure 3:
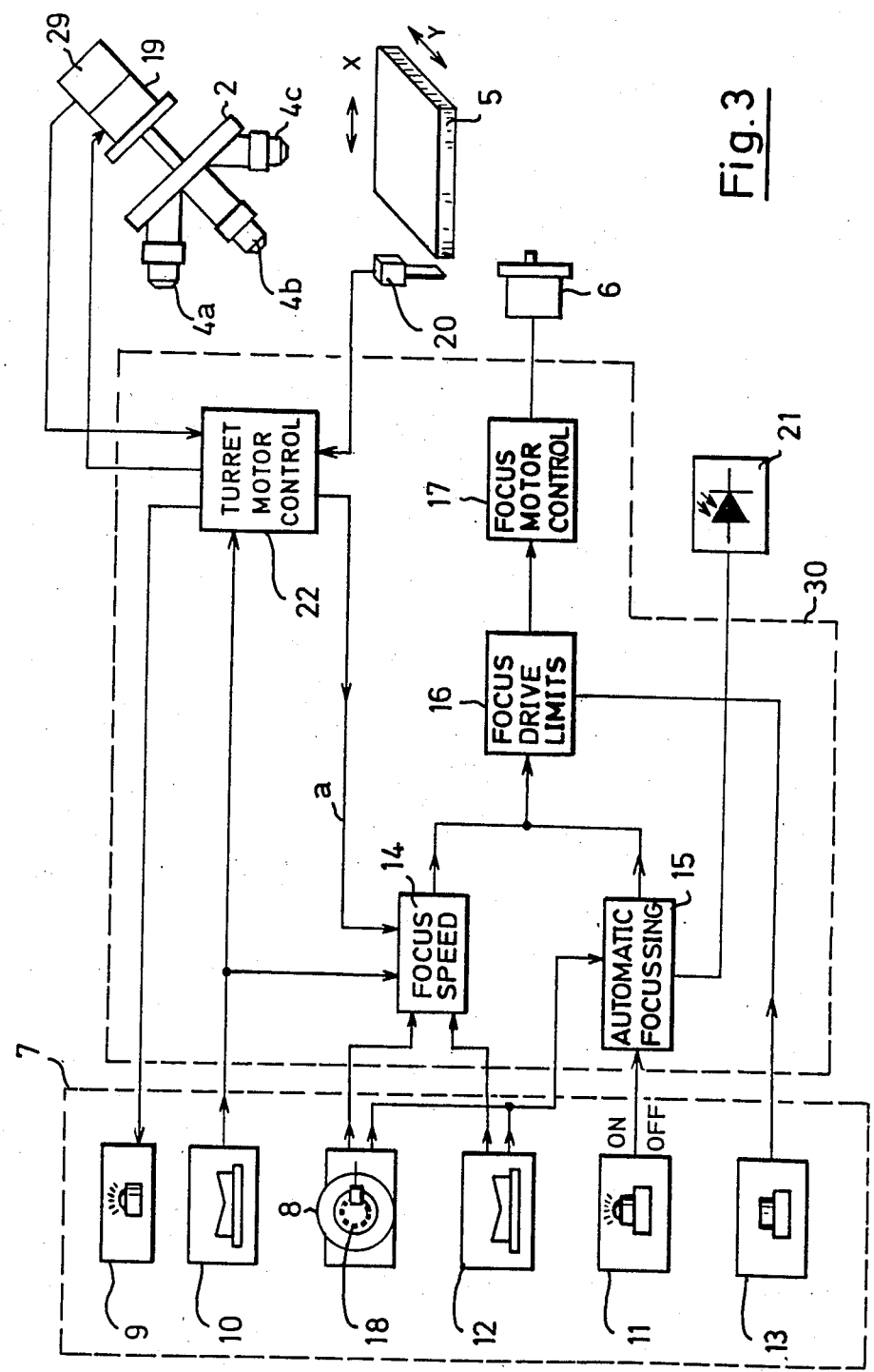
FIG. 3 is a block diagram of control electronics contained in a part of FIG. 1.

In FIG. 1, the stand 1 of a vertical microscope is shown carrying a lens turret 2, a binocular tube 3, a mechanical stage 5 and other elements (not further described) which customarily form part of a microscope.

The turret 2 is provided with a plurality of lenses 4a-4b-4c-4d of different magnification which are successively indexible into operating position by motor means within the stand 1. The lens 4c is a finder lens which is of low power but has a relatively large working distance.

The stage 5 is vertically adjustable for purposes of focusing. A second motor 6 is provided for driving this focusing movement; motor 6 is coupled to an end of the shaft of the focus drive and is shown at a location which is otherwise customary for manual adjustment knobs, namely, on the right-hand side of the microscope, as seen by the observer. The microscope of FIG. 1 is also provided with an auto-focus device (not shown) which may be as described for example, in Federal Republic of Germany OS No. 3,328,821.

Some of the most important operating elements necessary for the use of the microscope are located in a control console 7 which may be placed alongside the microscope and connected to it by a flexible cable. The control console 7 contains a finger wheel 8 for fine adjustment of focusing displacement, a rocker switch 10 for bi-directional control of indexed rotation of the turret 2, an on-off button 11 with integrated pilot lamp for the autofocus device, a pilot lamp 9 whose function will be described below, and, at the rear of the control console (see FIG. 2), another rocker switch 12 (see FIG. 2), and another button 13. The rocker switch 12 serves for in/out rapid displacement of the focus drive (rough focusing), while the button 13, when actuated, brings the limits of the range of travel determined by control electronics for the focus-drive motor 6 to the focus position which has just been set. In addition, a switch for switching microscope illumination from bright-field to dark-field can also be provided on the control console 7; but if switch 12 is not required for rough focusing, it can be used for bright-field/dark-field switching.

Control electronics for the turret-indexing and focus-drive motors are accommodated, as are also the electronics of the auto-focus device, within a separate control module 30 to which the control console 7 is connected.

Interaction of the above-enumerated operating elements for the control of the microscope can best be explained in reference to the block diagram of FIG. 3.

The switch 10 is connected to a control circuit 22 for the motor 19 which provides indexing drive to the turret 2. Upon actuation of switch 10, the turret lenses can be indexed in either direction; with each indexing, an angle sensor 29 reports the position of turret 2 to the control circuit 22. The control circuit 22 is also connected to a microswitch 20 adjacent stage 5, which is schematically shown by X-Y arrows to provide orthogonal components of displaceability, for a specimen carried thereby; such a stage, in conjunction with a switch (as at 20), is shown and described in detail in patent application Ser. No. 833,064, filed on even date herewith, in the context of specimen-transfer operations which are automatically initiated by the switch (e.g., switch 20) upon specimen-stage displacement into the transfer position.

As soon as the stage 5 actuates switch 20, the control circuit 22 initiates motor-19 rotation, and turret 2 indexes into the position in which the finder lens 4c is operatively in the ray path of the microscope. This has two advantages: on the one hand, it is customary after a change of specimens to commence an inspection at a lesser magnification; second, the finder lens 4c has a large working distance, so that damage to lens or specimen in the course of a specimen change can be reliably avoided. As soon as lens 4c is in position, this fact is indicated to the observer via lamp 9, responding to control circuit 22.

The finger wheel 8 for manual fine adjustment of the focus drive is connected to an encoder 18 which, upon actuation, supplies one or the other of two trains of digital pulses that are phase-dependent on the direction of rotation. These encoder-output signals are fed to a control circuit 14 for rapid displacement of the focus drive; the bi-directional switch 12 is also connected to control circuit 14. At control circuit 14, the stepdown ratio of finger-wheel (8) displacement, to focus-drive displacement (or, in the case of switch 12 actuation, to the speed of rapid focus adjustment), is correctively changed for consistencey with the power of the lens that is currently indexed into operative position. For this purpose, line a is shown connecting the turret-drive control circuit 22 to the focus-speed control circuit 14, whereby the latter always possesses data as to the instantaneous position of turret 2.

Further output connections from encoder 18 and from switch 12 act on a control circuit 15 for the autofocus device of the microscope, to de-activate the autofocus function as soon as either of the operating means (8 or 12) for manual focusing is actuated. Thus, an automatic focusing adjustment cannot oppose a manually controlled displacement; were it not for this feature, the photodiode or other sensor 21 of the auto-focus device would otherwise report a need to correct for loss of focus, for every manual focus adjustment to the autofocus control 15.

The outputs of the auto-focus control circuit 15 and of the manually operable focus-speed control circuit 14 are fed jointly to a circuit 16 which electronically limits the range of travel of the focus drive. Relative limit values can be set which are adapted to the range covered by the auto-focus device; these limit values then assure that the range covered by the auto-focus drive is not exceeded in manual focusing. Moreover, damage to lens and object (specimen) are avoided if the upper limit value is selected smaller than the smallest working distance of the lenses used. Upon reaching the limit, an acoustic signal is given off and motor 6 is disconnected. A reset button 13 enables the operator to make a new setting of limits of the travel range, as may be necessary upon encountering a change in object height while scanning the specimen on the stage 5.

Subject to limits set at circuit 16, the signal output of control circuits 14 and 15, is supplied to a driver circuit 17 for direct action on the focus-drive motor 6.

What is claimed is:

1. A microscope having a focus drive which can be moved by motor and having an operating means by which the focus drive can be manually controlled, characterized by the fact that the operating means is a finger wheel (8) or knob which is coupled to an electronic bit-signal generator (encoder 18) and is located in a separate control console (7) set up next to the microscope (1).

2. A microscope according to claim 1, characterized by the fact that the finger wheel (8) with the bit-signal generator (18) serves for fine adjustment of the focus drive and another switch (12) is provided on the control console (7) for rapid displacement of the focus drive.

3. A microscope according to claim 1, characterized by the fact that a switch is provided on the control console for switching the microscope illumination between bright-field and dark-field illumination.

4. A microscope according to claim 1, characterized by the fact that the control console (7) is connected to control electronics (14–17) for the motor (6) of the focus drive and, in addition, to the control electronics (15) for a device for the automatic adjustment of the focus.

5. A microscope according to claim 4, characterized by the fact that for the control electronics (15) of the device for the automatic adjustment of the focus an on/off switch (11) is provided on the control console (7), and the bit-signal generator (encoder 18) for manual focusing is so connected to the control electronics for the automatic-focus device that signal output from the encoder is operative to turn off the automatic-focus device.

6. A microscope according to claim 1, characterized by the fact that the microscope furthermore contains a motor-driven indexible lens turret (2) and a sensor or switch (20) which responds upon a predetermined positional change in the object to be examined, said sensor or switch (20) being connected upon such response to initiate an indexing of the lens turret (2) into a predetermined basic position, and that a switch (10) for indexing the turret is also integrated into the control console (7).

7. A microscope according to claim 6, characterized by the fact that at said basic position the turret (2) is equipped with a finder lens (4c) of low magnification.

8. A microscope according to claim 1, characterized by the fact that the control circuit (14–17) for the motor (6) of the focus drive is equipped with electronic range-limiting means (16).

9. A microscope with focus drive movable by motor, an indexible lens turret (2) which can also be indexed by motor and is provided with lenses (4) of different power, a switch (10) for indexing the lens turret, a finger wheel (8) or knob for the manual fine adjustment of the focus drive, a mechanical stage (5) to receive specimens, which stage can assume a given specimen-transfer position and a sensor (20) for recognizing the transfer position, upon the response of which sensor the lens turret (2) indexes to a lens (4c) of low power, characterized by a control console (7) which is arranged alongside the microscope and in which the finger wheel (8) or knob for the manual focusing and the switch (10) for the actuating of the lens turret are contained as well as an encoder (18) which is driven by the finger wheel (8) or knob, the digital output signals of said encoder (18) being fed to the control electronics (14–17) for the motor of the focus drive.

10. A microscope with focus drive moved by motor, a finger wheel (8) or knob for the manual fine adjustment of the focus drive, an auto-focus device (15) for automatically bringing the plane of focus of the microscope (1) onto the surface of the object to be examined and a switch (11) for connecting and disconnecting the auto-focus device, characterized by a control console (7) flexibly connected to and positionable alongside the microscope, in which there are contained a finger wheel (8) or knob for manual focusing and a switch (11) for on/off connection of the auto-focus device as well as an encoder (18) which is driven by the finger wheel or knob, the digital output signals of said encoder (18) being fed to control electronics (14) for manual focusing and to a control circuit (15) of the auto-focus device whereby to effectively disconnect the auto-focus device upon occurrence of encoder-output signals.

11. A microscope comprising a specimen stage, a multi-lens indexible turret, said stage and turret being relatively movable for accommodation of focal distance appropriate to a currently observed stage specimen and to the currently operative one of the turret lenses, a turret-indexing drive motor and electronic turret-indexing control means therefor, a focus-changing drive motor and electronic focus-changing control means therefor, said turret-indexing control means producing an output control signal which is indicative of the currently indexed position of said turret and which is supplied to said focus-changing control means, whereby focus drive may automatically accommodate the currently operative turret lens, said focus-changing control means further comprising manually operable fine-focus adjustment means including a digital-signal encoder connected for finely divided bi-directional incremental positioning control of said focus-changing drive motor.

* * * * *